United States Patent [19]
Bond

[11] Patent Number: 6,070,837
[45] Date of Patent: Jun. 6, 2000

[54] SUPPORT CLIP FOR A PITCHED ROOF

[76] Inventor: William R. Bond, 4710 Asdee La., Woodbridge, Va. 22192

[21] Appl. No.: 08/821,561

[22] Filed: Mar. 21, 1997

[51] Int. Cl.⁷ ........................................................ F16L 3/08
[52] U.S. Cl. ............................................. 248/71; 248/74.2
[58] Field of Search ............................. 248/71, 113, 74.5, 248/74.2; 2/245; 24/546, 326; 254/134.4; 242/125.2, 146

[56] References Cited

U.S. PATENT DOCUMENTS

| | | | |
|---|---|---|---|
| 1,711,730 | 5/1929 | Gibson | 248/113 |
| 2,251,744 | 8/1941 | Kurath et al. | 248/113 X |
| 2,797,886 | 7/1957 | Pinckney | 248/113 |
| 3,034,766 | 5/1962 | Hamrick | 254/134.4 |
| 3,357,668 | 12/1967 | Carrel | 248/113 X |

FOREIGN PATENT DOCUMENTS 161782  4/1921  United Kingdom ..................... 248/71

OTHER PUBLICATIONS

Gripper Clips Brochure From Gibson Good Tools, Inc., Grottoes, Virginia, USA.

*Primary Examiner*—Derek J. Berger
*Attorney, Agent, or Firm*—Palmer C. DeMeo

[57] ABSTRACT

A clip for supporting, fixing or stabilizing air hoses, water hoses, electrical cords, safety ropes, cables, etc., on an unshingled pitched roof. The clip is U-shaped and made from a strip or ribbon of material. The clip has a pair of spaced reentrant arms extending from the base. A pair of aligned spaced apertures is provided in the clip to permit a nail to pass therethrough and be partially hammered into the roof in order to secure the clip thereto; the pair of apertures is offset from the center of the clip.

15 Claims, 4 Drawing Sheets

SUPPORT CLIP FOR A PITCHED ROOF

BACKGROUND OF THE INVENTION

1. Field of the Invention

The present invention relates generally to a clip for supporting, fixing or stabilizing air hoses, water hoses, electrical cords, safety ropes, cables, etc., on an unshingled pitched roof. More particularly, the present invention concerns a U-shaped spring clip, one or more of which can be temporarily secured or fixed to a pitched roof in order to prevent such air hoses, water hoses, electrical cords, safety ropes or cables from sliding down a pitched roof and to facilitate the handling and use of such air hoses, water hoses, electrical cords, safety ropes or cables by a roofer or worker while working on an unshingled pitched roof of a house or building.

2. Description of the Related Art

Generally, a roofer or worker who uses an air hose, water hose, electrical cord, safety rope or cable for a particular application on an unshingled pitched roof will hammer one or more appropriately sized nails into the roof sheathing to temporarily support or fix the air hose, water hose, electrical cord, safety rope or cable thereto until the particular application has been completed after which the nails are removed. However, such a technique is awkward, cumbersome and time consuming to the roofer or worker and generally allows for the free movement of the air hose, water hose, electrical cord, safety rope or cable in one direction or another such that slack in these elements can be a problem either to another roofer or worker working on the roof or to the shrubbery at ground level.

SUMMARY

The present invention is directed to a clip, generally of U-shaped configuration, one or more of which can be used by a roofer or worker to temporarily support, fix or stabilize an air hose, water hose, electrical cord, safety rope or cable at one or more locations on an unshingled pitched roof. For example, a roofer often uses a pneumatic hammer to nail the shingles onto the roof sheathing. An air hose is connected between the air compressor generally located on the ground and the pneumatic hammer used by the roofer on the pitched roof of a building. Often times this air hose from the compressor is connected to a T-section ( henceforth: T ) at an opposite end such that two air hoses extend therefrom to respective pneumatic hammers so that two roofers can be working simultaneously to shingle the roof. Instead of using one nail at the T (as is customary) to stabilize the air hose(s) on the pitched roof so that both roofers can use their respective pneumatic hammers, an appropriately sized, U-shaped clip of this invention is used to stabilize the T at one location on the roof and individual, appropriately sized, U-shaped clips of this invention are used to further stabilize the two respective air hoses at other convenient locations on the roof. Another example, a worker may be doing some carpentry work on the roof which work would necessitate the use of an electrical skill saw. The electrical skill saw has an electrical cord extending therefrom and connected at the opposite end to an electrical power source or outlet at ground level. It is often necessary to temporarily fix the electrical cord at some convenient location on the unshingled roof and this is usually done by using one or more nails hammered into the roof sheathing. Instead of using nails to stabilize the electrical cord on the roof (which method is often awkward and unreliable), one or more appropriately sized, U-shaped clips of this invention is used resulting in a more convenient and reliable method of stabilizing the electrical cord on the pitched roof. In yet another example, a roofer or worker may need to use a water hose in order to clean dirt or refuse from some part of the roof or gutters of a house or building. Generally, nothing is used to hold or stabilize the water hose on the roof except for the roofer or worker himself. This often proves to be an awkward and precarious situation for the roofer or worker, especially if the water in the hose is under high pressure. The problem of using a water hose on an unshingled pitched roof is eliminated by using one or more of the clips of this invention.

The U-shaped clip of this invention is made from a strip or ribbon of sheet material. The clip has a substantially flat base and two opposing reentrant arms extending therefrom with a pair of spaced, aligned apertures therein which apertures are offset from the center of the clip. In use on a pitched roof, an appropriately sized nail is passed through the aligned apertures and partly driven into the roof by a hammer. An important feature of using a U-shaped clip of this invention is that by securing or fixing the U-shaped clip to a roof by a nail through one of its arms and its base the holding or gripping action of the clip is enhanced since the arm with the nail therein now has less flexibility than the opposing arm making the overall holding or gripping action of the clip greater than if the clip were secured or fixed through a single aperture in the central portion (generally, the base) of the clip.

Some other advantages of utilizing the clip of this invention on an unshingled pitched roof (for the purposes enumerated hereinbefore) are: prevents the hoses from pulling on the roofer or worker; eliminates tangles in the hoses, cords, ropes or cables on the roof; prevents air tools from falling off the roof; clips are easily carried by the worker or roofer; clips are reusable over and over again; and clips can be easily installed and removed by a hammer.

It is an object of this invention to facilitate the support, fixing or stabilizing of an air hose, water hose, electrical cord, safety rope or cable on an unshingled pitched roof by means of using one or more of the clips of this invention.

It is another object of this invention to provide a support clip which is especially adapted for use on a pitched roof.

Other objects and advantages of the use of the support clip of this invention will become apparent upon reading the following description, of which the attached drawings form a part.

DESCRIPTION OF THE PREFERRED EMBODIMENTS

Figure 1:
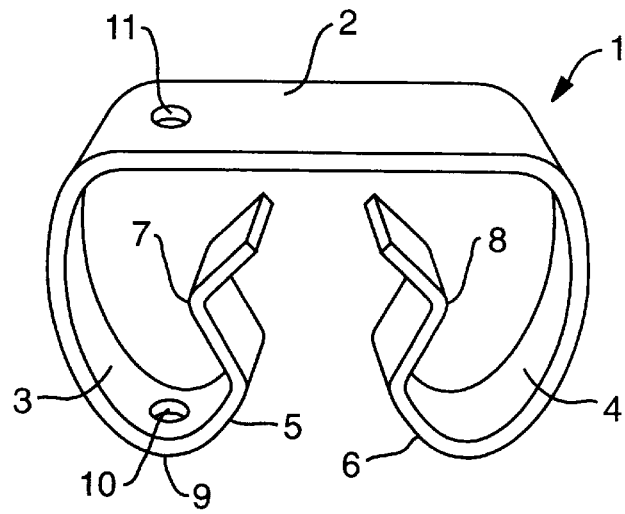
FIG. 1 is a perspective view of a support clip of this invention.

In FIG. 1, there is shown a support clip 1 of the present invention. The clip 1 is preferably made from spring steel but may be made from other metals or even from plastic materials. The clip 1 may also be constructed from a spring metal coated with vinyl but this would reduce the holding capacity of the clip. The clip 1 is formed from a strip or ribbon of spring steel with substantially a flat base 2 and a pair of curved arms extending therefrom and spaced opposite to each other. Each curved arm has an outwardly extending portion 3 or 4 and an inwardly extending portion 5 or 6. Each of the inwardly extending portions 5 or 6 has a gripping portion 7 or 8, respectively, near the center of the spring clip 1. The material and configuration of the spring clip 1 provide a degree of resiliency to enable the gripping portions 7 and 8 of the clip 1 to securely grip and maintain the hose, cord, rope or cable therebetween. In the curved bridge 9 between the curved portions 3 and 5 of one of the arms of the spring clip 1, there is an aperture 10 therein. In alignment therewith is another aperture 11 in the base 2 which aperture 11 is offset from the center of the base 2. The diameter of the apertures is approximately 3/16 inch to accommodate either an 8-penny or 16-penny nail. The spring clip itself may be of various sizes to accommodate the gripping of various sized air hoses, water hoses, electrical cords, safety ropes, or cables. Some of the more useful sizes are spring clips which have openings of 5/16 inch and 3/4 inch. A spring clip with the former sized opening will securely hold hoses, cords, ropes, and cables having a diameter between 3/8 inch to 5/8 inch and the latter sized opening will securely hold hoses, cords, ropes, and cables having a diameter between 3/4 inch to 1 and 1/8 inch. A spring clip having an arm to arm opening of 5/16 inch may, for example, have the following dimensions: 0.020 inch strip thickness, 1/2 inch strip width, 1 and 3/8 inch overall width from arm to arm, and 15/16 inch overall height. A spring clip having an arm to arm opening of 3/4 inch may, for example, have the following dimensions: 0.032 inch strip thickness, 5/8 inch strip width, 1 and 5/8 inch overall width from arm to arm, and 1 and 1/4 inch overall height. Each of the spring clips of this invention may be manufactured by techniques old and well known in the art. For example, a spring clip of this invention is formed from a strip or ribbon of spring steel and then bent into a U-shaped configuration (as shown in FIG. 1) by any conventional method old and well known in the art. Subsequently, the aligned pair of apertures are drilled through the U-shaped spring clip in one operation.

Figure 2:
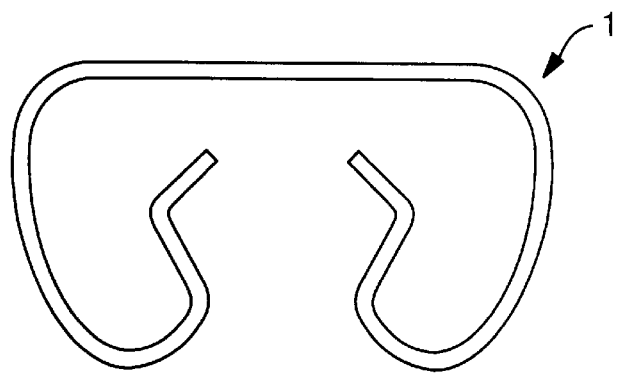
FIG. 2 is a side view of a support clip of this invention.
Figure 3:
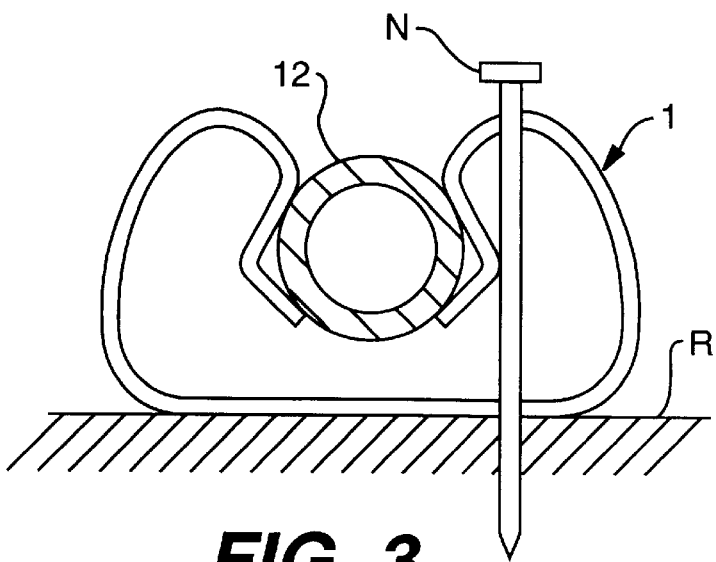
FIG. 3 is a side view of a support clip of this invention supporting an air hose therein and secured to a roof, partially shown.

FIG. 2 shows a side view of the spring clip 1. FIG. 3 shows a side view of the spring clip 1 secured to a roof R by means of a nail N and holding, for example, an air hose 12 shown in cross-section. The head of the nail N is purposely spaced a short distance from the bridge 9 of the clip 1 so that the claws of a hammer can be readily inserted therebetween to later remove the nail and the clip.

Figure 4:
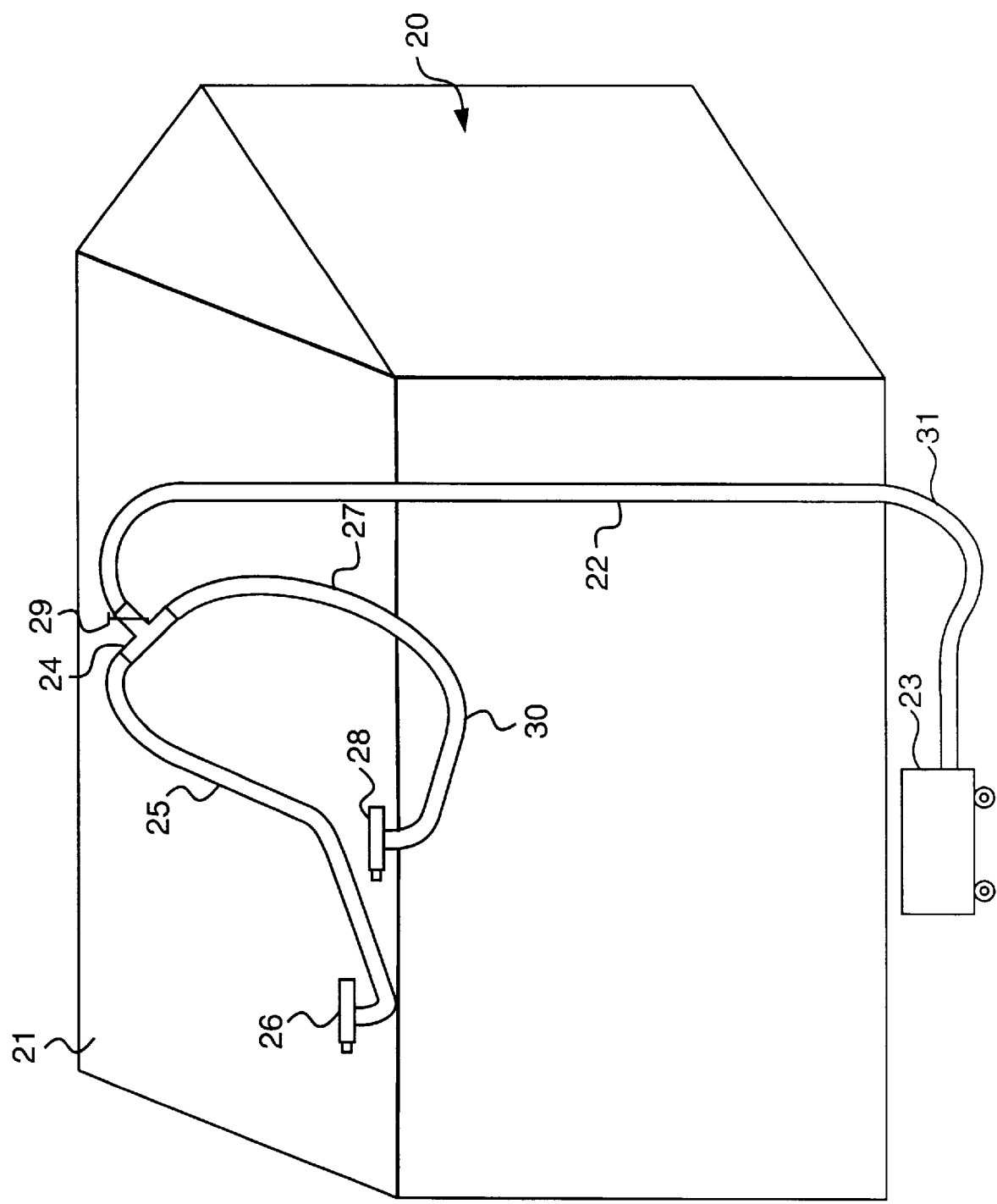
FIG. 4 is a perspective view of a pitched roof with air hoses thereon without the use of support clips of this invention.
Figure 5:
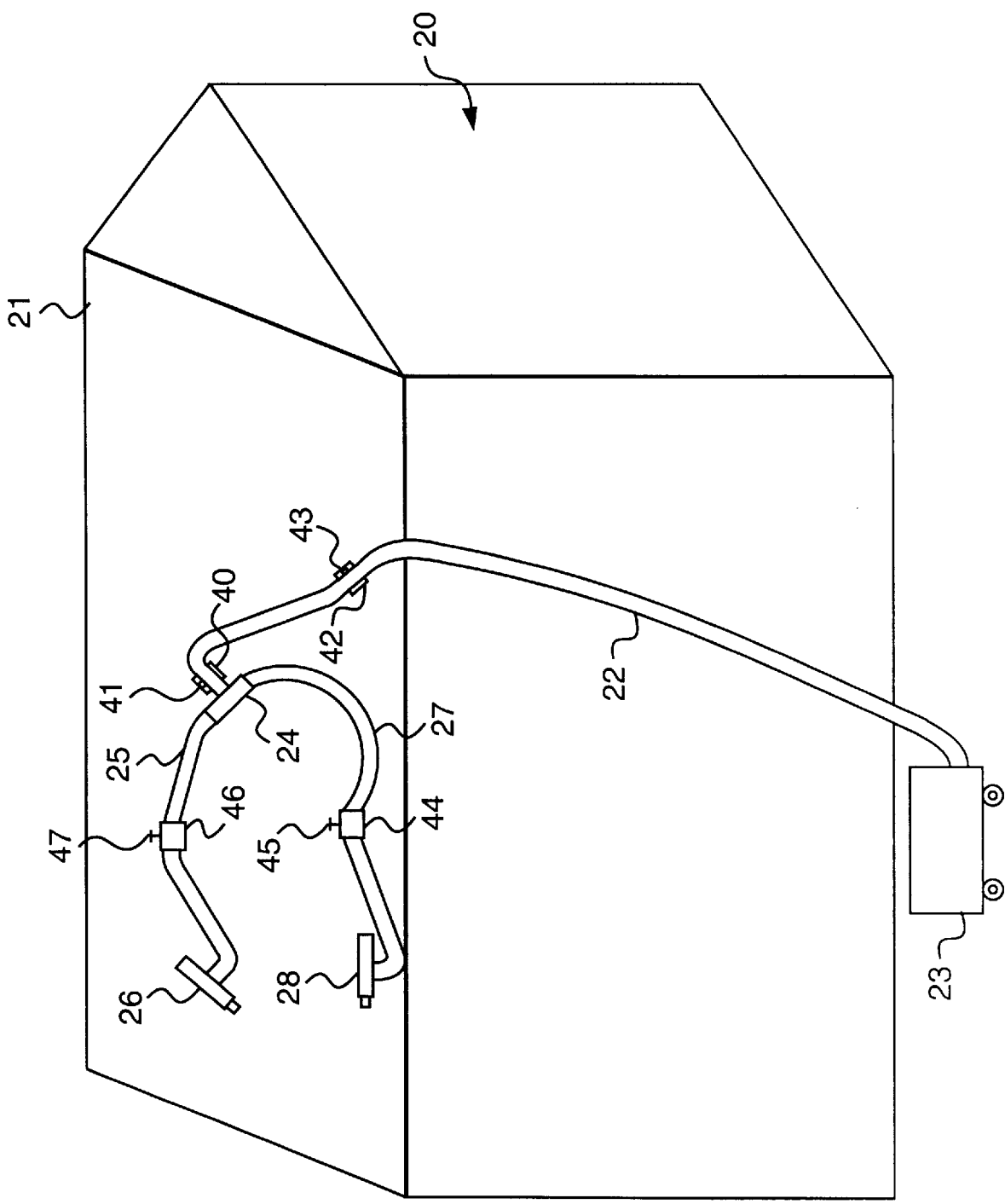
FIG. 5 is a perspective view of a pitched roof with air hoses thereon which are supported by clips of this invention.

In order to demonstrate one practical use of the spring clip 1 of this invention, reference is now made to FIGS. 4 and 5.

In FIG. 4, there is shown a house or building 20 with a pitched unshingled roof 21 and two pneumatic hammers 26 and 28 thereon. Each of the pneumatic hammers are connected to respective auxiliary, air pressure hoses 25 and 27 which are in turn connected to a T 24. The T 24 is thence connected to a main air pressure hose 22 which is in turn connected to an air compressor 23 at ground level. Generally, the air hose(s) is supported on the pitched roof 21 by means of a nail 29 while the roofers or workmen are doing their required work. However, due to the lengths of the auxiliary air hoses 25 and 27 and the length of the main air hose 22 there is some slack in each of the air hoses as seen, for example, at 30 and 31 in FIG. 4. The slack in the auxiliary hose 25 or 27 could interfere with other roofers or workmen working on the roof or the slack in the main air hose 22 could damage the shrubbery usually found on the ground near the base of the house or building 20. After the work on the roof 21 is completed, the air hoses 22, 25 and 27 are removed from the roof 21 and the holding nail 29 is removed from the roof sheathing.

In order to take up any slack in the air hoses or to locate the hoses on the roof 21 so as not to interfere with another roofer or workman working on the roof, several of the spring clips of this invention are used. As shown in FIG. 5, one spring clip 40 of an appropriate size is positioned on the roof 21 where it is desired to support the T 24. The spring clip 40 is then secured to the roof 21 by an appropriately sized nail 41 (for example, an 8 or 16 penny nail) which has been passed through the aligned holes in one arm and base of the clip 40 and hammered into the roof sheathing leaving sufficient space between the head of the nail 41 and the bridge 9 of the clip 40 so that the nail 41 can be easily extracted by a hammer after the work on the roof 21 has been completed. The T 24 is inserted into the spring clip 40 after clip 40 has been secured. Another spring clip 42 is then secured to the roof 21 at a location thereon whereby the slack 31 in the main air hose 22 is taken up so as not to damage any shrubbery on the ground near the house or building 20. The spring clip 42 is secured to the roof 21 by a nail 43 in a similar manner as spring clip 40. A third spring clip 44, secured by nail 45 to the roof 21, may also be used to take up any slack in the auxiliary air hose 27 as shown in FIG. 5. A fourth spring clip 46, secured by nail 47 to the roof 21, may also be used to move the auxiliary air hose 25 at a location on the roof 21 in order to provide an unencumbered area for another roofer or workman to work on the roof 21. This arrangement of the air hoses 22, 25, and 27 is only one of many arrangements that the air hoses can be positioned on the roof 21 depending on the particular circumstances or work to be done thereon.

Figure 6:
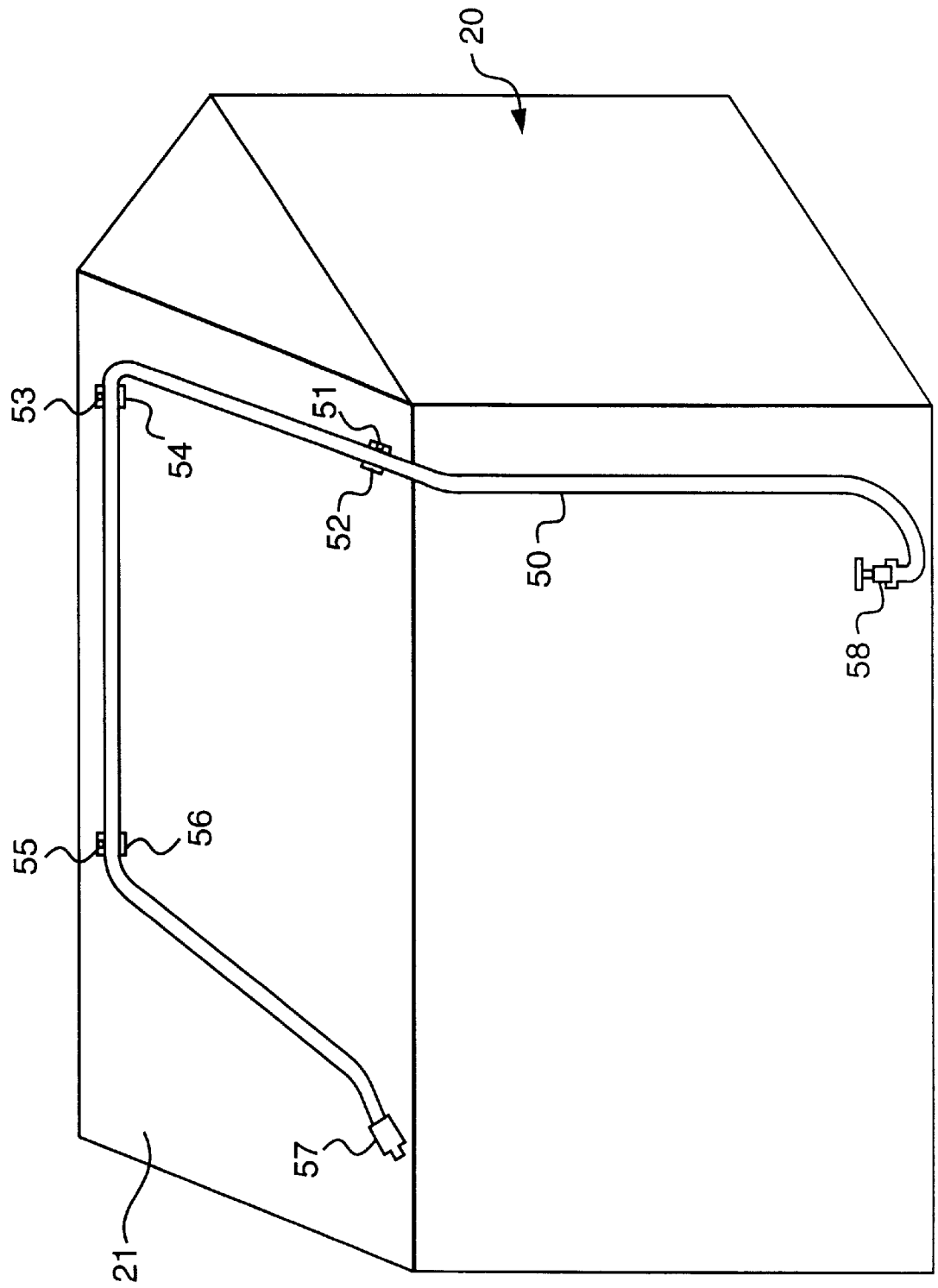
FIG. 6 is a perspective view of a pitched roof with a water hose thereon which is supported by clips of this invention.

Another practical example of the use of clips of this invention is shown in FIG. 6. A water hose 50 with a nozzle 57 is connected to a water faucet 58 and is supported and arranged on a roof 21 by means of three clips of this invention. One clip 52 with securement nail 51 is positioned near the base of the roof 21, a second clip 54 with securement nail 53 is positioned directly above the first clip 52 and near the ridge of the roof 21 and a third clip 56 with securement nail 55 is positioned laterally from the second clip 54 and near the ridge of the roof 21. This arrangement of a water hose 50 on a roof 21 will allow the roofer or worker much latitude in working area on the roof 21.

Different sized spring clips and arrangements of air or water hoses, electrical cords, safety ropes or cables on the roof 21 of a house or building can also be used as would be obvious to roofers or workmen in the roofing or construction art.

Modifications of this invention will be readily apparent to those skilled in the art and it is intended that the invention be not limited by the embodiments disclosed herein but that the scope of the invention be defined by the appended claims.

What is claimed is:

1. A support clip for an unshingled pitched roof, said support clip comprising a strip or ribbon of material, said strip or ribbon having a substantially flat base with a pair of spaced opposing arms extending therefrom, each opposing arm having a first portion extending away from said base and a second portion extending towards said base, said first and second portions being spaced from each other and having a bridge portion therebetween in an area where said first and second portions change directions relative to said base, each of said second portions having a gripping portion near the center of said clip, each gripping portion being spaced from each other and providing a holding mechanism for an object, a first aperture in said bridge portion of one of said arms, and a second aperture in said base wherein said second aperture is in alignment with said first aperture and offset from the center of said base.

2. The support clip of claim 1 wherein said material is metal or plastic.

3. The support clip of claim 1 wherein said material is spring metal.

4. The support clip of claim 1 wherein said material is metal and said strip or ribbon is coated with a plastic material.

5. The support clip of claim 4 wherein said plastic material is vinyl.

6. A spring clip comprising a U-shaped strip of material, said strip having a substantially flat base with two oppositely spaced arms extending therefrom, each of said arms having a reentrant portion extending towards said base and having a gripping portion near the center of said U-shaped strip, each of said gripping portions spaced in opposition to each other to form a gripping mechanism for an object, one of said arms having a first aperture in a section thereof furthest removed from said base, and said base having a second aperture therein aligned with said first aperture and offset from the center of said base.

7. The spring clip of claim 6 wherein said material is metal or plastic.

8. The spring clip of claim 6 wherein said material is spring metal.

9. The spring clip of claim 6 wherein said material is metal and said strip is coated with a plastic material.

10. The spring clip of claim 9 wherein said plastic material is vinyl.

11. A U-shaped clip for holding or supporting an object comprising a strip of resilient material, said strip having a substantially flat base with two opposing arcuate sections extending therefrom, an inwardly extending section connected to each of said arcuate sections by a curved bridge section, said inwardly extending section being spaced from its corresponding arcuate section, said inwardly extending section having a gripping section terminating near said base, each of said gripping sections being spaced from each other and providing a holding mechanism for an object, one of said curved bridge sections having a first aperture therein, and said base having a second aperture therein in alignment with said first aperture and offset from the center of said base.

12. The U-shaped clip of claim 11 wherein said material is metal or plastic.

13. The U-shaped clip of claim 11 wherein said material is spring metal.

14. The U-shaped clip of claim 11 wherein said material is metal and said strip is coated with a plastic material.

15. The U-shaped clip of claim 14 wherein said plastic material is vinyl.

\* \* \* \* \*